United States Patent [19]

Adam

[11] Patent Number: 4,845,209
[45] Date of Patent: Jul. 4, 1989

[54] CATIONIC PHTHALOCYANINE COMPOUNDS

[76] Inventor: Jean-Marie Adam, Rue de Village Neuf 60 D, 68300 Rosenau, France

[21] Appl. No.: 229,789

[22] Filed: Aug. 4, 1988

Related U.S. Application Data

[63] Continuation of Ser. No. 805,602, Dec. 6, 1985, abandoned.

[30] Foreign Application Priority Data

Dec. 6, 1984 [CH] Switzerland ............... 5824/84

[51] Int. Cl.$^4$ ............... C07D 487/22; C09B 47/32
[52] U.S. Cl. ............... 540/132; 540/123; 540/124; 540/125; 540/126; 540/127; 540/134
[58] Field of Search ............... 540/123, 125, 126, 127, 540/132, 124, 134

[56] References Cited

U.S. PATENT DOCUMENTS

| | | | |
|---|---|---|---|
| 2,863,875 | 12/1958 | Bienert et al. | 260/314.5 |
| 3,210,345 | 10/1965 | Gamlen et al. | 260/242 |
| 3,954,392 | 5/1976 | Dien | 540/134 X |
| 4,537,721 | 8/1985 | Groll et al. | 540/134 X |
| 4,565,688 | 1/1986 | Malin et al. | 540/134 X |
| 4,648,992 | 3/1987 | Graf et al. | 540/124 |
| 4,648,993 | 3/1987 | Colberg et al. | 540/134 |

FOREIGN PATENT DOCUMENTS

| | | |
|---|---|---|
| 1061010 | 7/1959 | Fed. Rep. of Germany . |
| 3248466 | 7/1984 | Fed. Rep. of Germany . |
| 446578 | 3/1968 | Switzerland . |
| 953904 | 4/1964 | United Kingdom . |
| 969033 | 9/1964 | United Kingdom . |

*Primary Examiner*—Richard L. Raymond
*Attorney, Agent, or Firm*—Wenderoth, Lind & Ponack

[57] ABSTRACT

The invention relates to phthalocyanine compounds of the formula

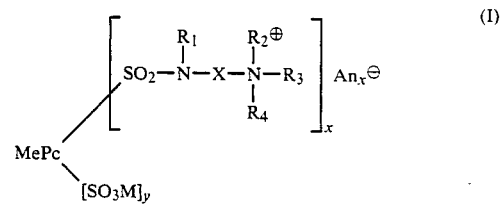

wherein
  MePc is a copper, cobalt or nickel phthalocyanine radical,
  $R_1$ is hydrogen or alkyl,
  X is alkylene, and
  $R_2$, $R_3$ and $R_4$, are each independently alkyl which is unsubstituted or substituted by hydroxy, alkoxy, phenyl or amino, or $R_1$ and $R_2$, when taken together, are methylene, ethylene or propylene if X is methylene or ethylene, or two or three of $R_2$, $R_3$ and $R_4$, together with the nitrogen atom, form a 5- to 7-membered unsubstituted or substituted heterocyclic ring which may contain one or two additional hetero atoms selected from the group consisting of O, N and S as ring members,
  $An^\ominus$ is a cation and M is a cation, and x is greater than y and y is greater than 0, and the sum of $x+y$ is 4 or less than 4.

These compounds can be used as dyes, in particular for dyeing and printing cellulosic materials and polyacrylonitrile materials, especially paper.

8 Claims, No Drawings

CATIONIC PHTHALOCYANINE COMPOUNDS

This application is a continuation of now abandoned application Ser. No. 805,602, filed Dec. 6, 1985.

The present invention relates to novel cationic phthalocyanine compounds, to their preparation, and to the use thereof as dyes for dyeing or printing textile materials, leather and, in particular, paper.

The novel cationic phthalocyanine compounds are characterised by the formula

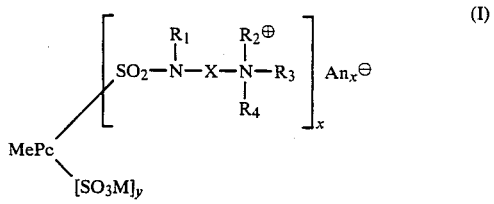

wherein
MePc is a copper, cobalt or nickel phthalocyanine radical,
$R_1$ is hydrogen or alkyl,
X is alkylene, and
$R_2$, $R_3$ and $R_4$ are each independently alkyl which is unsubstituted or substituted by hydroxy, alkoxy, phenyl or amino, or $R_1$ and $R_2$, when taken together, are methylene, ethylene or propylene if X is methylene or ethylene, or two or three of the substituents $R_2$, $R_3$ and $R_4$, together with the nitrogen atom, form a 5- to 7-membered unsubstituted or substituted heterocyclic ring which may contain one or two additional hetero atoms selected from the group consisting of O, N and S as ring members,
$An^\ominus$ is an anion and M is a cation,
and x is greater than y and y is greater than 0, and the sum of x+y is 4 or less than 4.

$R_1$ as alkyl is preferably a $C_1$-$C_6$alkyl radical, most preferably a $C_1$-$C_4$alkyl radical, which may be unbranched or branched. Examples of such alkyl radicals are: methyl, ethyl, n-propyl, isopropyl, n-pentyl and n-hexyl and isohexyl. In preferred compounds of formula (I), $R_1$ is hydrogen.

The alkylene radical X preferably contains 2 to 8, e.g. 2 to 5 and, most preferably, 3 carbon atoms. If, however, $R_1$ and $R_2$ together are the methylene, ethylene or propylene radical, then X is methylene or ethylene, preferably ethylene.

If $R_2$, $R_3$ and $R_4$ are each independently an alkyl radical, then said radical may be unbranched or branched. Preferably the alkyl radical is a $C_1$-$C_4$alkyl radical and may be substituted by hydroxy, alkoxy, phenyl or amino groups. An alkoxy group substituent is preferably a $C_1$-$C_4$alkoxy group (unbranched or branched such as methoxy, ethoxy, n-propoxy or isopropoxy). An amino group substituent is e.g. the —$NH_2$ group, the $NH(C_1$-$C_4$alkyl) group or the $N(C_1$-$C_4$alkyl)_2$ group. A phenyl substituent can be further substituted, e.g. by methyl, methoxy and/or halogen.

Where $R_1$ and $R_2$ together are methylene, ethylene or propylene, the group

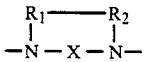

forms a saturated heterocyclic ring which contains two nitrogen atoms, with the proviso that, if $R_1+R_2$ are methylene, X may not also be methylene. The ring that is formed is 5- to 7-membered.

Examples of such rings are: imidazoline, piperazine, hexahydropyrimidine, 1,3- or 1,4-diazacycloheptane. Preferably $R_1+R_2$ and X are each ethylene, so that the piperazine ring is formed.

Two of the substituents $R_2$, $R_3$ and $R_4$, together with the nitrogen atom, may form a 5-, 6- or 7-membered heterocyclic ring. This ring may additionally contain one or two further hetero atoms, preferably one further hetero atom, as ring member or members selected from the group consisting of O, N and S, preferably of N and O. Such rings may also be substituted, for example by $C_1$-$C_4$alkyl, $C_1$-$C_4$hydroxyalkyl, amino, alkylamino or dialkylaminoalkyl (wherein all alkyl moieties contain 1 to 4 carbon atoms). These rings are preferably saturated heterocyclic rings. Typical examples are the pyrrolidine, piperidine or morpholine ring, or the unsubstituted or substituted piperazine or azacycloheptane ring. The piperazine ring may carry e.g. as substituent at the nitrogen atom a $C_1$-$C_4$alkyl group, which may in turn carry hydroxyl or amino groups.

A heterocyclic ring formed by $R_2$, $R_3$ and $R_4$ together with the nitrogen atom may also additionally contain further hetero atoms as ring members, as described above, and is unsubstituted or substituted. Such a ring is preferably an unsaturated, e.g. aromatic or bicyclic, ring, for example an unsubstituted or substituted (e.g. by OH, $NH_2$, COOH, CN or $C_1$-$C_4$alkyl) pyridine ring or the ring of the formula

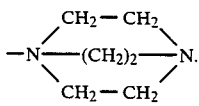

Compounds meriting special mention are those compounds of formula (I), wherein MePc is the radical of copper phthalocyanine.

In preferred phthalocyanine compounds of formula (I), $R_1$ is hydrogen or $C_1$-$C_4$alkyl or, when taken together with $R_2$, is ethylene if X is ethylene; $R_2$, $R_3$ and $R_4$ are each independently $C_1$-$C_4$alkyl, $C_1$-$C_4$-hydroxyalkyl or $C_1$-$C_4$phenylalkyl, with the proviso that preferably only one of these three substituents is a substituted alkyl radical; or two of the substituents $R_2$, $R_3$ and $R_4$, together with the nitrogen atom, is a saturated 5- or 6-membered heterocyclic ring which is unsubstituted or substituted by one or two $C_1$-$C_4$alkyl and/or $C_1$-$C_4$hydroxyalkyl groups and which may additionally contain a further O or N atom as ring member; or $R_2$ together with $R_1$ is ethylene.

Particularly preferred compounds of formula (I) are those wherein $R_1$ is hydrogen or, when taken together with $R_2$, is ethylene if X is ethylene, and $R_2$, $R_3$ and $R_4$ are each independently $C_1$-$C_4$alkyl, $C_1$-$C_4$hydroxyalkyl or benzyl, with the proviso that only one of these substituents may be hydroxyalkyl or benzyl, or $R_2$ together with $R_1$ is ethylene; or two of the substituents $R_2$, $R_3$ and $R_4$, together with the nitrogen atom to which they are attached, form the pyrrolidine, piperidine or morpholine ring or the $C_1$-$C_4$alkyl-substituted or $C_1$-$C_4$hydroxyalkyl-substituted piperazine ring.

Compounds of formula (I) which are of practical importance are especially those wherein $R_2$, $R_3$ and $R_4$ are each independently $C_1$-$C_4$alkyl, preferably methyl, as well as those wherein $R_1$ is hydrogen.

The anion $An^\ominus$ is one of the customary organic and inorganic, preferably colourless, anions of cationic dyes. The anion is normally introduced in the preparatory process (e.g. by the quaternisation) or by the optional isolation and purification. However, anions can also be selectively exchanged by conventional methods.

Examples of possible anions $An^\ominus$ are: halide (e.g. chloride, bromide or iodine) ions, boron tetrafluoride, thiocyanide, sulfate, alkylsulfate (e.g. methylsulfate or ethylsulfate), aminosulfate, chlorate, perchlorate, carbonate, bicarbonate, phosphate, phosphoromolybdate, phosphorotungstate, phosphorotungstomolybdate, benzenesulfonate, chlorobenzenesulfonate, naphthalenesulfonate, toluenesulfonate, oxalate, maleate, formate, acetate, propionate, lactate, succinate, chloroacetate, tartrate, methanesulfonate and benzoate ions, and also complex anions, in particular those of chlorozinc double salts, e.g. the tetrachlorozinc anion.

Preferably $An^\ominus$ is a halide, methylsulfate, ethylsulfate, phosphate, sulfate, carbonate, benzenesulfonate, toluenesulfonate, 4-chlorobenzen, acetate, formate or tetrachlorozinc anion. Most preferably, the compounds of the present invention are obtained as halides (especially chlorides), methosulfates, ethosulfates, sulfates, benzenesulfonates or toluenesulfonates.

A cation M may be the hydrogen ion or the equivalent of a metal cation. For example, M is the hydrogen ion, an alkali metal cation or alkaline earth metal cation or an ammonium ion (i.e. $NH_4^\oplus$ or the cation of a primary, secondary or tertiary amine). Preferably M is the hydrogen ion or an alkali metal cation (e.g. the sodium, potassium or lithium ion, preferably the sodium ion), but is most preferably the hydrogen ion.

The compounds of the present invention are cationic, for which reason x must be greater than y. The value of y is greater than 0, preferably greater than 0.5 and, most preferably, 1 or greater than 1. In preferred compounds of the formula (I), x−y is 0.1 to 1.5. The sum of x+y is preferably 1.5 to 4, most preferably 2.5 to 3.5.

The novel cationic compounds of formula (I) have very good solubility in cold water and are not pH-sensitive, especially in the pH range from 4–10.

The novel cationic compounds of formula I may be prepared by methods which are known per se, for example (a) by quaternising a compound of formula

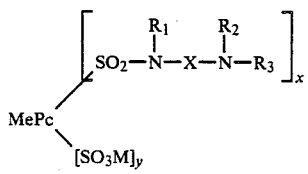

with a compound of formula

R$_4$- An    (III)

in which formulae the general symbols are as defined for formula (I), or (b) by reacting a compound of formula

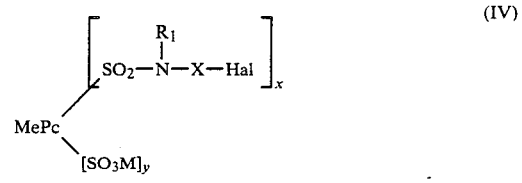

with a compound of formula

wherein Hal is a halogen atom and the other symbols are as defined for formula (I).

The quaternisation of the compound of formula (II) with the compound of formula (III) is carried out in known manner, for example in an inert organic solvent, e.g. in a hydrocarbon, chlorinated hydrocarbon or nitrohydrocarbon such as benzene, toluene, xylene, tetrachloroethane, chloroform, carbon tetrachloride, monochlorobenzene, dichlorobenzene or nitrobenzene, in an acid amide or acid anhydride such as dimethylformamide, N-methylacetamide or acetic anhydride, in dimethyl sulfoxide or in a ketone such as acetone or methyl ethyl ketone. An excess of the alkylating agent may also be used instead of an organic solvent. The quaternisation may also be effected in aqueous medium, e.g. in aqueous suspension, or in glacial acetic acid. It is advantageous to effect the quaternisation at elevated temperature, e.g. in the range from 30° to 200° C., in patricular from 80° to 150° C., if appropriate with the addition of an acid acceptor such as inorganic base, e.g. magnesium oxide, magnesium carbonate, sodium carbonate, calcium carbonate or sodium bicarbonate, under pressure or at normal pressure. The most favourable conditions can in each case easily be determined in a preliminary test.

Known quaternising agents $R_4An$, which introduce the radical $R_4$ and the radical An of which is converted into the anion $An^\ominus$, are employed for the quaternisation. Typical examples of such quaternising agents are: alkyl halides, halohydrines, alkylene oxides, alkyl esters of sulfuric acid or alkyl esters of organic sulfonic acids, e.g. methyl chloride, methyl bromide, methyl iodide, ethyl chloride, ethyl bromide, ethyl iodide, propyl bromide, propyl iodide butyl bromide, benzyl chloride, benzyl bromide, ethylene chlorohydrine, dimethyl sulfate, diethyl sulfate, dibutyl sulfate, methyl benzenesulfonate, methyl p-toluenesulfonate, ethyl p-toluenesulfonate, propyl p-toluenesulfonate, butyl p-toluenesulfonate, n-propyl benzenesulfonate, isopropyl benzenesulfonate, n-butyl benzenesulfonate, sec-butyl benzenesulfonate, tert-butyl benzenesulfonate, trimethyloxonium borofluoride, as well as ethylene oxide and propylene oxide.

Examples of preferred quaternising agents $R_4An$ are alkyl halides, e.g. methyl chloride, ethyl chloride, methyl bromide, ethyl bromide, butyl bromide, methyl iodide or ethyl iodide, and, in particular, alkyl sulfates, e.g. dimethyl sulfate, diethyl sulfate and dibutyl sulfate, and alkyl esters of aromatic sulfonic acids, e.g. methyl p-toluenesulfonate and methyl benzenesulfonate, as well as n-propyl benzenesulfonate, isopropyl benzenesulfonate, n-butyl benzenesulfonate, sec-butyl benzenesulfonate and tert-butyl benzenesulfonate. Thus the radical An is preferably halogen (e.g. Cl, Br, I), alkyl-SO$_4^\ominus$ or

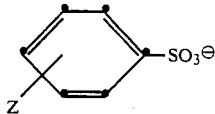

(Z = H, halogen, methyl).

The reaction of the compound of formula (IV) with the tertiary amine of formula (V) is preferably carried out in the temperature range from about 0° to 80° C. and, most preferably, at room temperature. An excess of amine, an organic solvent and/or water may be used as reaction medium. Suitable tertiary amines are in particular trimethylamine and triethylamine. The compound of formula (V) may, however, also be a nitrogen-containing heterocycle, e.g. unsubstituted or substituted pyridine or 1,4-diazabicyclo[2.2.2]octane (triethylenediamine).

The starting compounds of formula (II) are obtained e.g. by reacting a phthalocyanine sulfochloride of formula

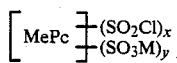 (VI)

with an amine of formula

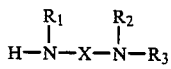 (VII)

in which formulae the general symbols are as defined for formula (I).

The phthalocyanine sulfochlorides of formula (VI) can carry the sulfochloride groups in positions 3 and 4 of the benzene nuclei. They are obtained in conventional manner by treating the appropriate metal phthalocyanine or metal phthalocyaninesulfonic acids with chlorosulfonic acid, optionally with the addition of thionyl chloride. Depending on the chosen reaction conditions and on the amount of chlorosulfonic acid or thionyl chloride, compounds of formula (VI) with specific ratios of x:y are obtained. For isolation, the chlorosulfonic acid solutions are poured onto ice and the precipitated phthalocyanine sulfochlorides are collected by suction filtration and further processed in the form of aqueous pastes.

Representative examples of amines of formula (VII) are:
1-amino-2-dimethylaminoethane,
1-amino-2-diethylaminoethane,
1-methylamino-2-dimethylaminoethane,
1-amino-3-dimethylaminopropane,
1-amino-3-diethylaminopropane,
1-methylamino-3-dimethylaminopropane,
4-amino-1-diethylaminopentane,
N-methylpiperazine, and
N-(3-aminopropyl)pyrrolidine.

The starting compounds of formula (IV) are obtained in corresponding manner to those of formula (II) by reacting a phthalocyanine sulfochloride of formula (VI) with a compound of formula

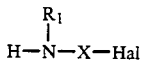 (VIII)

wherein R$_1$ and X have the given meanings and Hal is a halogen atom.

After the reaction of the compound (II) with (III) or (IV) with (V), the novel cationic compounds may be isolated from the reaction medium and dried. If desired or necessary, in cationic compounds of formula (I) the anion An$^\ominus$ can be replaced in known manner by another anion.

The novel compounds can also be converted direct, after concentrating the reaction mixture, into a liquid commercial formulation, or they can be employed as powder or granular formulations.

The novel cationic compounds of formula I are used as dyes for dyeing or, with the aid of binders and optionally solvents, for printing materials which are dyeable with cationic dyes, for example textile materials which advantageously consist of homopolymers or copolymers of acrylonitrile, or synthetic polyamides or polyesters which are modified by acid groups. Dyeing is preferably carried out in aqueous, neutral or acid medium by the exhaust process, at normal pressure or under pressure, or by the continuous process. The textile material may be in a multiplicity of forms, for example as fibres, filaments, woven goods, knitted goods, piece goods and finished articles such as shirts or pullovers.

Level turquoise dyeings or prints of very good all-round fastness properties can be obtained by application of the dyes.

Further, the novel cationic dyes can also be used for dyeing and printing natural and regenerated cellulosic material, especially cotton and viscose. In this case too, strong turquoise dyeings are obtained. The novel dyes have good affinity for these textile materials, a good degree of exhaustion, and the dyeings obtained have very good fastness properties, in particular wetfastness properties.

A further preferred utility of the novel cationic dyes of formula (I) is that of dyeing paper of all kinds, especially bleached, unsized and sized lignin-free paper. Most particularly, these dyes are suitable for dyeing unsized paper (tissues) owing to their very pronounced affinity for this substrate.

The novel compounds exhaust very well onto these substrates, leaving the wastewaters almost colourless. This feature constitutes a considerable ecological advantage.

The resultant dyeings are wetfast, i.e. they have no tendency to bleed when dyed paper in the wet state is contacted with moist wet white paper. This property is particularly desirable for tissues which, in the wet state (e.g. impregnated with water, alcohol, surfactant solutions etc.), are likey to come in contact with other substrates such as textiles, paper and the like, which must be protected against soiling.

The excellent affinity for paper and the very rapid rate of exhaustion of the novel dyes is of great advantage for the continuous dyeing of paper and permits a much broader use of this known economic process.

The novel dyes can be applied by a wide range of different processes to the paper material, e.g. in pulp dyeing, in the size press and from aqueous inks by the INK JET method.

Finally, the dyes of the present invention can also be used for dyeing leather (e.g. by spray dyeing, brushing and dipping) and for the preparation of inks.

The invention is illustrated by the following non-limitative Examples. Parts and percentages are by weight.

EXAMPLE 1

11.5 parts of the compound of formula

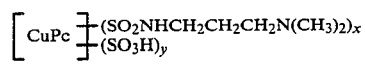
(1a)

($x=2.1$ and $y=1.1$) are dissolved at 50° C. in 50 parts of dimethylformamide and then 4 parts of dimethylsulfate are added to the solution. The reaction mixture is heated for 1 hour to 100° C., then cooled to room temperature and diluted with 100 parts of acetone. The precipitated dye of formula

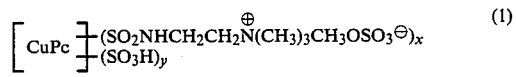
(1)

($\lambda_{max}=606$ nm), wherein $X=2.1$ and $y=1.1$, is readily soluble in water and dyes paper in clear turquoise shades irrespective of the pH.

Dyes with comparably good tinctorial properties are obtained by replacing the starting compound employed in this Example by analogous starting compounds in which $x=2$, $z$ and $y=1.6$ or $x=1.7$ and $y=1.5$.

The starting compound of formula (1a) is prepared as follows: 60 parts of copper phthalocyanine are dissolved at 25° C. in 350 parts of chlorosulfonic acid and the solution is heated for 6 hours to 130° C. The reaction mixture is then cooled to 80° C. and treated with 70 parts of thionyl chloride. Stirring is continued for 4 hours at this temperature and the reaction mixture is poured onto ice and the product is isolated by filtration and washed with water. The moist paste so obtained is suspended in 500 parts of water and to the suspension are added 65 parts of 1-amino-3-dimethylaminopropane. The mixture is stirred for 1 hour at 60° C., the precipitate is isolated by filtration, washed with warm water and dried. The resultant compound corresponds to formula (1a).

The starting compounds employed in the subsequent Examples 3-13 are obtained in corresponding manner by reacting the phthalocyanine sulfochloride with the appropriate amine.

EXAMPLE 2

11.5 parts of the starting compound of formula (1a) employed in Example 1 are suspended in 80 parts of water and to this suspension are added 4 parts of dimethylsulfate. The reaction mixture is stirred for 1 hour at 25° C. and heated at a rate of 10°/h to 55° C. Then 15 parts of formic acid are added. The liquid dye solution so obtained can be used direct for dyeing paper.

If the starting material (1a) used in Example 1 is replaced by an equimolar amount of each of the compounds of formula

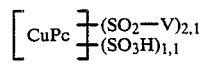

listed in column 2 of the following table and quaternisation is carried out with an alkylating agent indicated in column 3 according to the process described in Example 1, there are obtained the compounds of formula

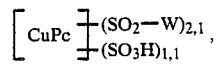

listed in column 4, which dye paper in clear turquoise shades, irrespective of the pH.

TABLE

| Example | V | Alkylating agent | W | Shade on paper |
|---|---|---|---|---|
| 3 | $-NH-(CH_2)_3-N(C_2H_5)_2$ | $(CH_3)_2SO_4$ | $-NH-(CH_2)_3-\overset{\oplus}{N}(C_2H_5)(C_2H_5)(CH_3)\ CH_3SO_4^{\ominus}$ | turquoise blue |
| 4 | $-NH-(CH_2)_3-N(CH_3)_2$ | $(C_2H_5)_2SO_4$ | $-NH-(CH_2)_3-\overset{\oplus}{N}(CH_3)(C_2H_5)(CH_3)\ C_2H_5SO_4^{\ominus}$ | turquoise blue |
| 5 | $-NH-(CH_2)_3-N(CH_3)_2$ | C$_6$H$_5$-CH$_2$Cl | $-NH-(CH_2)_3-\overset{\oplus}{N}(CH_3)(CH_2C_6H_5)(CH_3)\ Cl^{\ominus}$ | turquoise blue |
| 6 | $-NH(CH_2)_3-N(CH_3)_2$ | $CH_2OH-CHOH-CH_2Cl$ | $-NH-(CH_2)_3-\overset{\oplus}{N}(CH_3)(CH_2CHOH-CH_2OH)(CH_3)\ Cl^{\ominus}$ | turquoise blue |
| 7 | $-NH(CH_2)_3-N(CH_2CH_2OH)(CH_3)$ | $(CH_3)_2SO_4$ | $-NH-(CH_2)_3-\overset{\oplus}{N}(CH_2CH_2OH)(CH_3)(CH_3)\ CH_3SO_4^{\ominus}$ | turquoise blue |

TABLE-continued

| Example | V | Alkylating agent | W | Shade on paper |
|---|---|---|---|---|
| 8 | $CH_3$<br>\|<br>$N-(CH_2)_2-N(CH_3)_2$ | $(CH_3)_2SO_4$ | $CH_3$<br>\|<br>$-N-(CH_2)_2-\overset{\oplus}{N}(CH_3)_3\ CH_3SO_4^{\ominus}$ | turquoise blue |
| 9 | $NH-(CH_2)_3-N\overset{\frown}{\underset{\smile}{\phantom{X}}}O$ | $(CH_3)_2SO_4$ | $-NH-(CH_2)_3-\overset{CH_3}{\underset{\oplus}{N}}\overset{\frown}{\underset{\smile}{\phantom{X}}}O\ CH_3SO_4^{\ominus}$ | turquoise blue |
| 10 | $-N\overset{\frown}{\underset{\smile}{\phantom{X}}}N-CH_3$ | $(CH_3)_2SO_4$ | $-N\overset{\frown}{\underset{\smile}{\phantom{X}}}\overset{\oplus}{N}\overset{CH_3}{\underset{CH_3}{\diagdown}}\ CH_3SO_4^{\ominus}$ | turquoise blue |
| 11 | $-N\overset{\frown}{\underset{\smile}{\phantom{X}}}N-CH_2-CH_2OH$ | $(CH_3)_2SO_4$ | $-N\overset{\frown}{\underset{\smile}{\phantom{X}}}\overset{\oplus}{N}\overset{CH_3}{\underset{CH_2-CH_2OH}{\diagdown}}\ CH_3SO_4^{\ominus}$ | turquoise blue |
| 12 | $-NH-(CH_2)_3-N\overset{\frown}{\underset{\smile}{\phantom{X}}}O$ | $(C_2H_5)_2SO_4$ | $-NH-(CH_2)_3-\overset{C_2H_5}{\underset{\oplus}{N}}\overset{\frown}{\underset{\smile}{\phantom{X}}}O\ C_2H_5SO_4^{\ominus}$ | turquoise blue |
| 13 | $-NH-(CH_2)_3-N\overset{\frown}{\underset{\smile}{\phantom{X}}}$ | $(CH_3)_2SO_4$ | $-NH-(CH_2)_3-\overset{CH_3}{\underset{\oplus}{N}}\overset{\frown}{\underset{\smile}{\phantom{X}}}\ CH_3SO_4^{\ominus}$ | turquoise blue |

Compounds that likewise produce dyeings of good fastness properties on paper are obtained by replacing in Examples 1-13 the copper phthalocyanine starting compounds by the corresponding cobalt or nickel phthalocyanine compounds.

EXAMPLE 14

Paper stock consisting of 50 % bleached pine sulfite pulp and 50 % bleached beech sulfite pulp is beaten in a hollander with water to a Schopper-Riegler freeness of 30° such that the solids content is somewhat over 2.5 %, and the fibre suspension is subsequently adjusted with water to a solids content of exactly 2.5 %.

5 parts of a 1.5 % aqueous solution of the dye of Example 1, which has been made weakly acidic with acetic acid, are added to 200 parts of the fibre suspension and the batch is stirred for about 5 minutes. The pulp is then diluted with about 500 parts of water and paper sheets are then prepared therefrom in conventional manner by feeding the pulp by suction to a sheet former. A strong turquoise blue dyeing is obtained on the paper sheets.

EXAMPLE

With stirring, 0.5 g of the liquid dye formulation of Example 2 is added to 200 g of a 2.5 % paper stock consisting of 50 % bleached pine pulp and 50 % bleached birch pulp and having an SR freeness of 35°. Then sizing is effected with 10 g of a 1 % resin size solution and 20 g of a 1 % solution of aluminium sulfate and the pulp is diluted with 500 g of water. After stirring for 15 minutes, the dyed paper pulp is poured onto a sheet former with filter paper base and sucked off. The sheet of paper is couched in a press between two sheets of filter paper and felts of equal size and then dried for about 5 minutes at 100° C. on a hot cylinder. A brilliant turqoise dyeing is obtained on the paper.

If the paper obtained in this manner is beaten to a pulp in water and the resultant suspension is treated with 1 % of active chlorine (based on the stock) at pH 7 to 2, a virtually colourless pulp is obtained.

EXAMPLE 16

10 g of the liquid dye formulation obtained in Example 2 is stirred into a size press solution consisting of 50 g of none-ionic starch and 20 g of sizing agent (ABS polymer), and crude paper or weakly sized paper is dyed at 20° C. at a rate of about 5 to 7 m/min and an application of about 25 % (laboratory padder type, ex W. Mathis, Niederhasli, Switzerland). The paper is dyed in level brilliant turquoise shades and can be readily bleached using sodium hypochlorite solution.

EXAMPLE 17

10 parts of cotton fabric (bleached mercerised cotton) are dyed in a laboratory beam dyeing apparatus in 200 parts of a liquor (water hardness:10° German hardness, pH 4, 3 revolutions of the dye liquor per minute) that contains 0.05 part of the dye of Example 1. The temperature is raised from 20° to 100° C. over 60 minutes and then kept constant for 15 minutes. The dye liquor is completely exhausted and a strong turquoise dyeing is obtained on the cotton fabric.

A strong turqoise dyeing is also obtained with the dye of Example 1 by dyeing a regenerated cellulose (viscose) textile fabric by the identical procedure.

Turquoise dyeings with good properties are likewise obtained by using in Examples 14-17 a compound of each of Examples 3-16 instead of the dye of Example 1.

What is claimed is:

1. A phthalocyanine of the formula

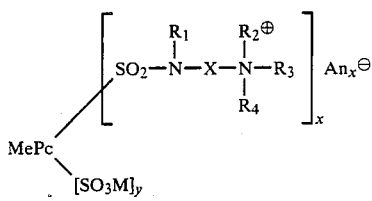

wherein

MePc is a copper, cobalt or nickel phthalocyanine radical, $R_1$ is hydrogen or alkyl, X is alkylene, and $R_2$, $R_3$ and $R_4$ are each independently alkyl which is unsubstituted or substituted by hydroxy, alkoxy, phenyl or amino, or $R_1$ and $R_2$, when taken together, are methylene, ethylene or propylene if X is methylene or ethylene, or two or three of the substituents $R_2$, $R_3$ and $R_4$, together with the nitrogen atom to which they are attached, form a 5- to 7-membered unsubstituted or substituted heterocyclic ring which may contain one or two additional hetero atoms selected from the group consisting of O, N and S as ring members, $An^\ominus$ is an anion and M is a cation, and y is 1 or greater than 1, x−y is 0.1 to 1.5, and the sum of x+y is 4 or less than 4.

2. A phthalocyanine compound according to claim 1, wherein MePc is the copper phthalocyanine radical.

3. A phthalocyanine compound according to claim 1, wherein X is $C_2$–$C_8$alkylene.

4. A phthalocyanine compound according to claim 1, wherein $R_1$ is hydrogen or $C_1$–$C_4$alkyl or, when taken together with $R_2$, is ethylene if X is ethylene; $R_2$, $R_3$ and $R_4$ are each independently $C_1$–$C_4$alkyl, $C_1$–$C_4$hydroxyalkyl or $C_1$–$C_4$phenylalkyl, with the proviso that only one of these three substituents may be a substituted alkyl radical; or two of the substituents $R_2$, $R_3$ and $R_4$, together with the nitrogen atom to which they are attached, is a saturated 5- or 6-membered heterocyclic ring which is unsubstituted or substituted by one or two $C_1$–$C_4$alkyl and/or $C_1$–$C_4$hydroxyalkyl groups and which may additionally contain a further O or N atom as ring member; or $R_2$ together with $R_1$ is ethylene.

5. A phthalocyanine compound according to claim 4, wherein $R_1$ is hydrogen or, when taken together with $R_2$, is ethylene if X is ethylene, and $R_2$, $R_3$ and $R_4$ are each independently $C_1$–$C_4$alkyl, $C_1$–$C_4$hydroxyalkyl or benzyl, with the proviso that only one of these three substituents may be hydroxyalkyl or benzyl, or $R_2$ together with $R_3$ is ethylene; or two of the substituents $R_2$, $R_3$ and $R_4$, together with the nitrogen atom to which they are attached, form the pyrrolidine, piperidine or morpholine ring or the $C_1$–$C_4$alkyl-substituted or $C_1$–$C_4$hydroxyalkyl-substituted piperazine ring.

6. A phthalocyanine compound according to claim 1, wherein $R_1$ is hydrogen.

7. A phthalocyanine compound according to claim 1, wherein $R_2$, $R_3$ and $R_4$ are each independently unsubstituted $C_1$–$C_4$alkyl.

8. A phthalocyanine compound according to claim 1, wherein M is hydrogen.

* * * * *